May 30, 1939. N. C. PRICE 2,160,281
AIRCRAFT POWER PLANT
Filed Dec. 9, 1938 6 Sheets-Sheet 1

May 30, 1939.  N. C. PRICE  2,160,281
AIRCRAFT POWER PLANT
Filed Dec. 9, 1938  6 Sheets-Sheet 2

INVENTOR

May 30, 1939.　　　　N. C. PRICE　　　2,160,281
AIRCRAFT POWER PLANT
Filed Dec. 9, 1938　　　6 Sheets-Sheet 6

INVENTOR
Nathan Price

Patented May 30, 1939

2,160,281

UNITED STATES PATENT OFFICE 2,160,281

AIRCRAFT POWER PLANT

Nathan C. Price, Seattle, Wash.

Application December 9, 1938, Serial No. 244,815

20 Claims. (Cl. 244—53)

My invention relates to a novel method of propelling aircraft more efficiently during flight and of increasing the effective lift of the wings of the aircraft during the approach to land. In addition this technique includes a new power plant structure which is very compact and which requires no separate supporting members. The fluid flow courses associated with the thermodynamic process of the power plant are uniquely arranged to offer a minimum flow resistance, yet a maximum rate of heat transfer. Therefore the conversion of heat into power is accomplished with an exceedingly light structure.

The invention is characterized in part by fuel burning apparatus which forms gases of combustion for expansion in a heat engine. The power from the engine is contributed directly or indirectly to a reduction gear for driving propulsive airscrews. In addition a second working vapor is generated by heat transmitted from the gases of combustion and is employed to operate a cluster of expansion turbines for driving the reduction gear. The exhaust vapor from the turbines is condensed in a heat disposal core. A thermally controlled atmospheric air compressor forces the cooling air through the core in accordance with the cooling requirements. The heated air issuing from the core is caused by appropriate structure to react propulsively upon the core, thereby moving the aircraft along its normal line of forward flight. The cooling air passing through the core may be diverted, subject to a control, to retard the forward motion of the aircraft and to increase the lift of the wing.

The degree of compression of air being supplied to the combustion chamber may be so great that inter-cooling may be necessitated in order to increase the volumetric efficiency of the induction system and to overcome detonation in the combustion chamber. If such is the case, the inter-cooling is performed together with the second working vapor condensation in the heat disposal core. The automatic regulation of the air flow through the core compensates for variations in atmospheric temperature or density during change of operational altitude of the aircraft.

The objectives of the power plant are, first, to increase the thermodynamic efficiency of the aircraft propulsion system; second, to decrease the weight involved in the aircraft power plant installation; third, to increase the maximum speed of the aircraft; fourth, to decrease the landing speed of the aircraft; fifth, to provide a power plant installation which does not hamper the aerodynamic efficiency of the aircraft at all; sixth, to supply a power plant capable of producing great power at high altitudes as well as at low altitudes; and, seventh, to provide a complete power installation which is quickly removable from the aircraft for overhaul or maintenance.

The structure required to accomplish these and other ends is diagrammatically illustrated in the accompanying figures. However the description so provided may be modified in detail to accomplish the same objectives. Therefore I claim the invention in its broader sense, and not merely in strict accordance with the details submitted.

Figure 18 illustrates the automatic thermal control for regulation of the heat dissipation in the core, which condenses the exhaust working fluid and cools the compressed combustion supply air.

Figure 1:
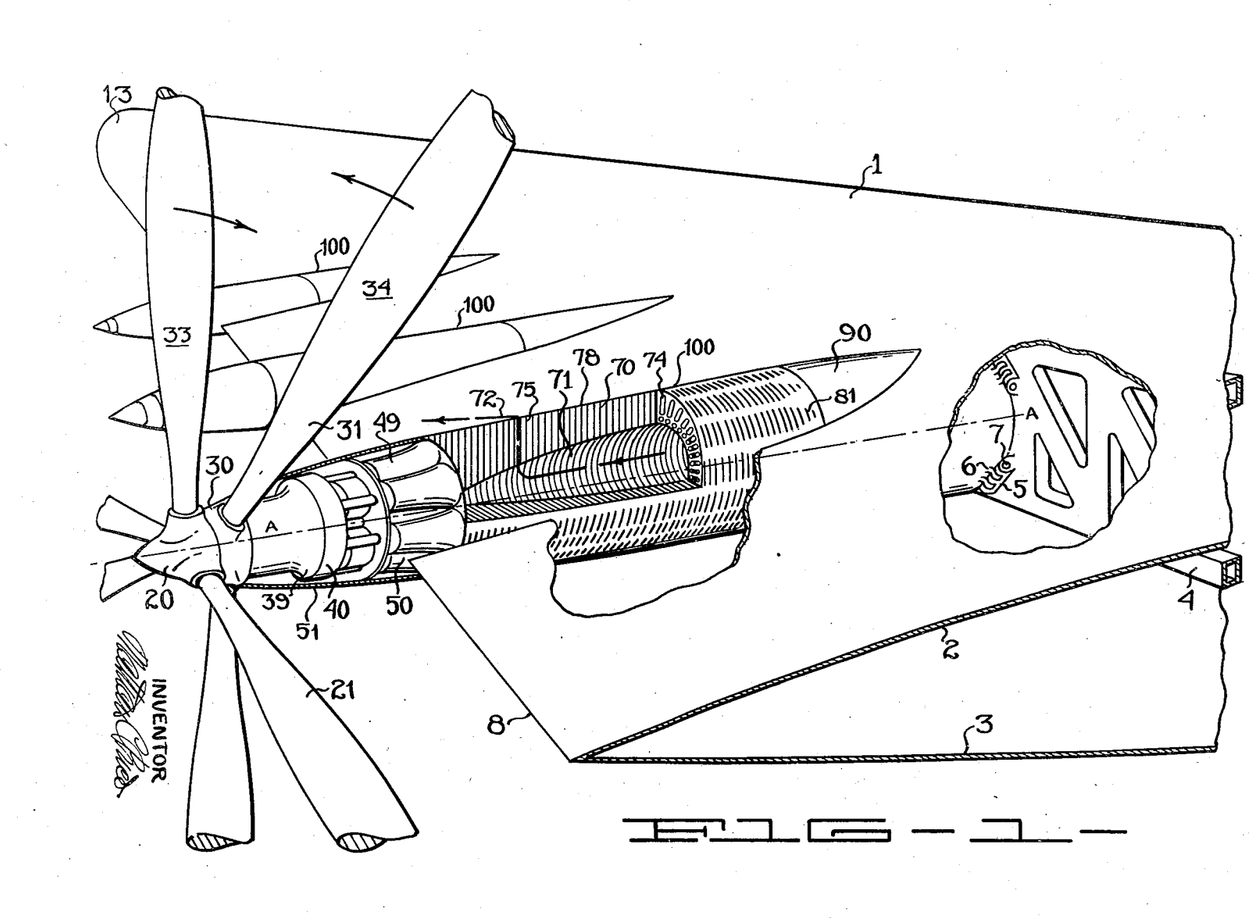
Figure 1 is a perspective view of the power plant of the invention installed in the wing of a multi-engine aircraft. Portions of the upper skin of the wing are broken away to show parts of the power plant and its attachments to the wing, which would otherwise be hidden. The reduction drive gear housing of the power plant is illustrated in section and a quadrant has been removed from part of the heat disposal core.

In Figure 1 an aircraft wing is provided with a tip 13, a trailing edge 8, an upper skin 2, a lower skin 3, and a structural spar 4 between the skins for absorbing concentrated wing loads. Some power plants 100 of the invention project from the spar 4 in a direction opposite to that of forward flight of the aircraft. The power plants are spaced along the wing span and although each power plant is directly locked to the spar, it is quickly removable as an integral unit to facilitate substitution of a fresh power plant at the aircraft service terminal.

The power plant possesses a cylindrical shape so slender that the projection of it through the skin of the wing does not materially disrupt the continuous airfoil shape of the wing. Accordingly there is no harmful turbulence resulting from the presence of the power plant, which would reduce the efficiency of the wing and which would tend to cause buffeting of the aircraft tail surfaces. The power plant extends with constant diameter rearward past the trailing edge 8. Further to the rear it commences to decrease in diameter at a reduction gear housing 51. It continues to decrease at a front propeller hub 30, and rear propeller hub 20, and finally vanishes to a point on the central axis of the power plant. The hub 30 bears some blades 31 of a propeller 34, and the hub 20 carries some blades 21 of a propeller 33.

Each power plant forms a source of power for driving the screw propellers and it is advantageous to further extend its usefulness, employing it as the sole support for the propellers 33 and 34 from the spar 4. Thus each component part of the power plant serves not only as heat dissipating surface, or as a boundary surface for directing working or cooling fluids, but also as the only structure for connecting the propellers to the strength concentration of the wing. The elimination of separate supporting structures for the propellers and of separate nacelles or fairings for the power plant effects a saving of weight and space and tends to simplify the airplane.

The invention combines the power plant heat disposal core in the power plant structure. This arrangement saves weight and permits a perfect egress for the cooling air issuing from the heat disposal core. Accordingly a cylindrical core 78 having a pressure air throat 71 along the power plant central axis A, and composed of some circular core fins 75 spaced by some gaps 70 through which the air flows radially outward to the atmosphere from the throat 71, constitutes the central section of the power plant.

The propeller hubs 20 and 30 are driven by a reduction gear assembly 39 in the housing 51. A turbine drive cluster 49 within the housing 51 contributes power to the gear assembly. The turbine cluster is shown in detail in Figure 2. A high pressure turbine 56 having a nozzle box 60, a casing 67, some buckets 66, an extraction chamber 58, and an extraction duct 61 leading from the chamber 58 for regenerative vapor cycle feed liquid heating, is located along the central axis A of the power plant. The exhaust working vapor from the high pressure turbine 56 is distributed radially outward along some receivers 57 to some low pressure turbines 50. The turbines 50 discharge into a supply chamber 73 of the core 78.

Figures 3, 4, 5, 6, 7, 8:
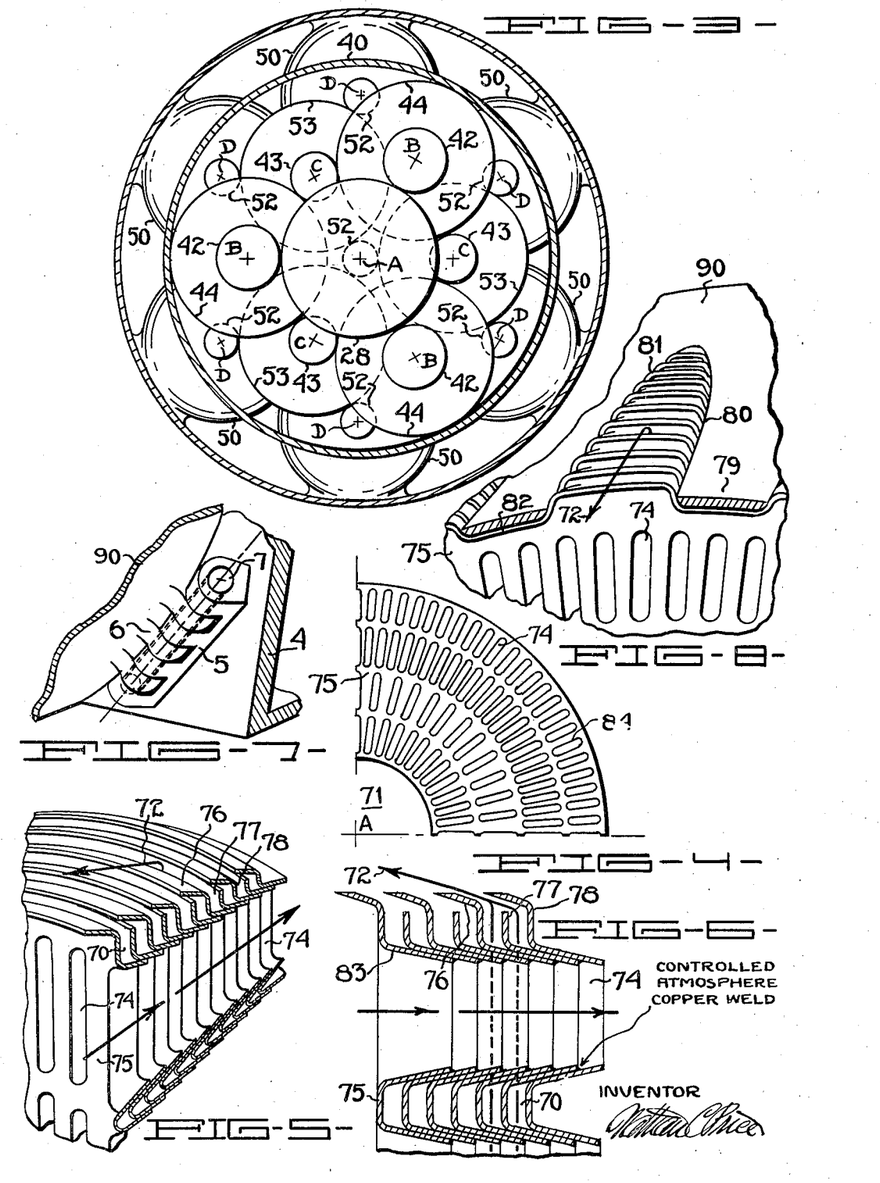
Figure 3 is a phantom view of the reduction gear assembly and turbine cluster, looking along the central axis of the power plant.
Figure 4 represents a quadrant of a cooling fin of the heat disposal core, viewed along the central axis of the power plant.
Figure 5 is a perspective view of a fragment of the heat disposal core.
Figure 6 is a view of a fragment of the heat disposal core, in section parallel to the central axis of the power plant.
Figure 7 is a perspective view of the structure which permits rapid detachment of the power plant installation from the wing of the aircraft.
Figure 8 is a perspective view of a fragment of the heat disposal core adjacent to the forward end thereof.

In Figure 3 it is shown that the cluster contains six low pressure turbines grouped closely about the high pressure turbine and having axes parallel to the axis A. Some axes D of the low pressure turbines define the apexes of an imaginary hexagon having a center at the axis A. The turbine cluster is the most compact and lightest arrangement of turbines for expansion of working vapor through a large and therefore efficient ratio. Furthermore the turbine cluster fills a cylindrical space, which conforms to the shape of the remainder of the power plant facilitating compactness and strength in the power plant as a whole. The cluster arrangement makes it possible to balance the tangential thrusts of the gear drive from the turbines. Accordingly a drive pinion 52 of the high pressure turbine 56 and six drive pinions of the low pressure turbines 50 bear against three gears 53 located among the pinions. Each gear 53 meshes with the high pressure turbine pinion and with a pair of the low pressure turbine pinions. Regions of tooth contact on the gears 53 are 120 degrees apart. Some axes C of the gears 53 define the apexes of an imaginary triangle having a center at the axis A. The resultant balance of tangential gear thrusts lessens wasteful friction in the bearings supporting the gears 53 and the pinion of the high pressure turbine. A transverse web 54 of the housing 51 aligns the gears 53 and the pinions 52 and therefore the load which must be borne by the web 54 is likewise reduced.

The rotational speed of each of the low pressure turbines 50 can be made equal to that of the high pressure turbine 56 without over-stress of the turbine wheels because the diameter of each of the low pressure turbine wheels is as small as that of the high pressure turbine wheel. The working fluid is nevertheless properly expanded because six low pressure turbines are provided in connection with the single high pressure turbine. Then the speed of each turbine can be made very high, about 30,000 revolutions per minute for example, and there results a saving of power plant weight. The efficiency of the turbines is improved due to the comparatively small surface for development of windage losses.

Although the speed of rotation is reduced to 7,300 revolutions per minute, for example, in the gears 53, further speed reduction is still necessary before the power is efficiently usable in the screw propellers. It is also advantageous to accomplish torque directional differentiation and equal division of power between the propellers 33 and 34. Counter-rotation of the propellers eliminates air twist in the propeller slip-stream and reduces the propeller diameter requirements. Therefore the torque is carried from three pinions 43 extending along the axes C fom the gears 53 to three gears 44 along some axes B, and then in turn to three pinions 42 attached to the gears 44 along the axes B. The axes B define the apexes of an imaginary triangle having a center at the axis A.

Figure 2:
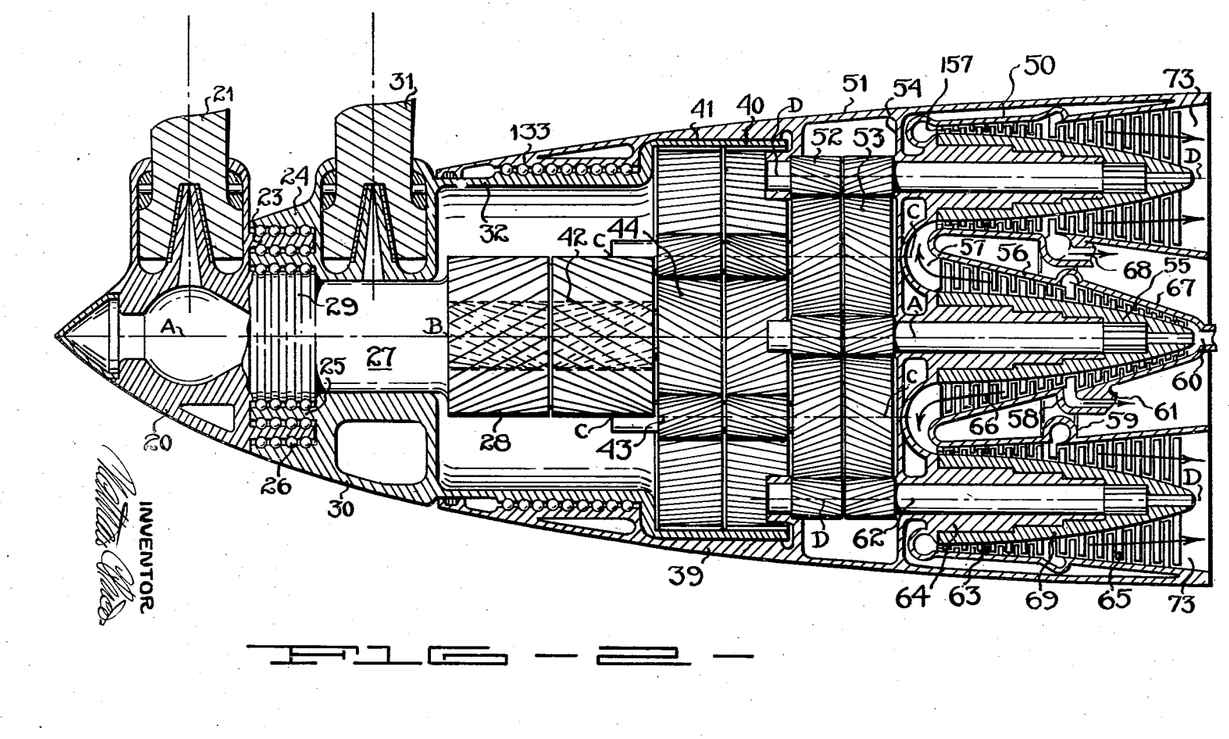
Figure 2 is a drive view of the counter-rotation screw propellers, the reduction drive gear assembly, and the turbine drive cluster in section along the central axis of the power plant.

In Figure 2 the outer surface of an internal gear 40 is borne within a bearing surface 41 of the gear housing 51, and meshes with each of the gears 44. A tubular drive shaft 32 attaches the gear 40 to the front propeller hub 30. A tandem ball thrust bearing 133 between the shaft 32 and the housing 51 transmits the thrust of the hub 30 to the housing 51. An external gear 28 in mesh with each of the pinions 42 is enclosed within the space provided by the hollow of the shaft 32. The torque delivered to the gear 28 is transmitted along a drive shaft 27 which passes concentrically through a bore of the hub 30 to the hub 20 of the rear propeller. The thrust and radial forces of the rear propeller are absorbed by some tandem bearing balls 26 fitted between some inter-locking shoulders 24 and 25 of the hub 30. The shoulders are ring-like extensions from the hub and have centers at the axis A, for engagement with some shoulders 23 and 29 of the hub 20.

In aggregate the outlets of the low pressure turbines 50 define an annular shape because the low pressure turbines are grouped about the circumference of the high pressure turbine 56. Therefore the supply chamber 73 is constructed as an annular channel, and each of the heat disposal core fins 75 is shaped as an annular disc perforated with some concentric circular rows 84 of longitudinal core channels 74 for receiving the exhaust working fluid with a minimum of turbulence, as illustrated in Figure 4.

Figure 5 shows the channels 74 passing lengthwise of the core. The channels are relatively deep in the radial direction and narrow in the circumferential direction to permit radial flow of cooling air between.

Figure 6 illustrates that the channels 74 are composed of telescopic flanges 83 of the fins 75, which are bonded together by a controlled atmosphere copper weld causing the channels throughout the core to be imperforate and strong. Pure nickel sheet approximately ten thousandths of an inch thick is an appropriate material for the fins. Some of the fins 75 have sharp edges 77, while alternate fins have some flanges 76 stamped at the periphery. The flanges 76 are telescopic, yet spaced from one another to form nozzles which face in a direction opposite to that of flight. Accordingly the heated air issuing radially from the gaps 70 is deflected in a rearward direction by the flanges 76 and is caused to expand adiabatically by the nozzle-like action of the flanges. An effective jet reaction is produced upon the flanges 76 causing a propulsive thrust in the core 78. The heat dissipated from the core is largely recovered in the form of useful work.

Figure 1 represents a sleeve 90 joining the front end of the core 78, and in Figure 7 the attachment of the sleeve 90 to the wing spar 4 is shown in detail. Some spaced tongues 6 of the sleeve engage some spaced tongues 5 of the spar. A removable pin 7 passes through the tongues 5 and 6 and locks the sleeve 90 to the spar 4.

A method of joining the core 78 to the sleeve 90 is illustrated in Figure 8. The flanges of the fins 75 are indented longitudinally to form some recesses 82. Some straps 79 extend rearward from the sleeve 90 within the recesses 82. The straps transfer the bending forces involved in the support of the power plant from the sleeve 90 to the core 78, and are copper welded to the fins 75.

The straps 79 define some longitudinal slots 80 within which are some up-raised fin flanges 81. Some propulsive air jets 72 issue from the core 78.

Figure 9:
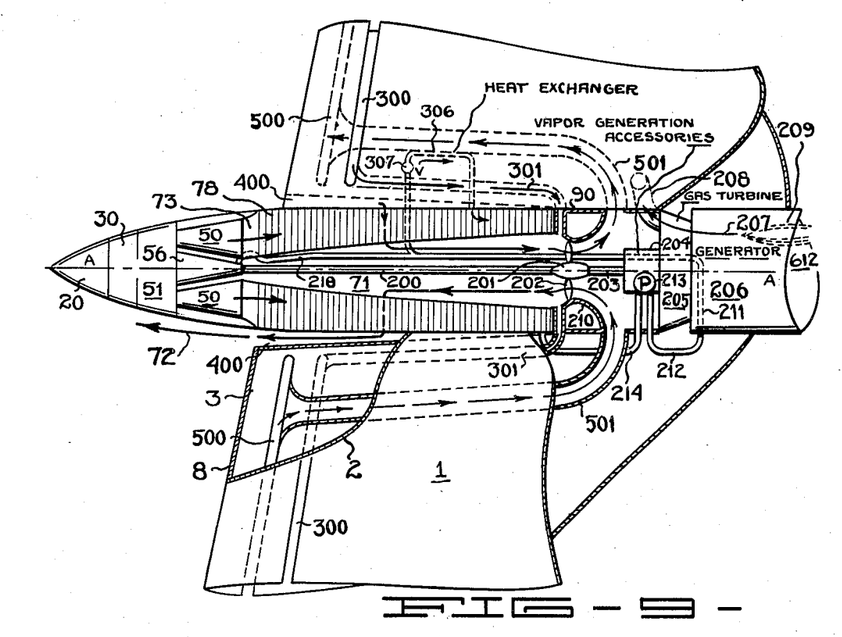
Figure 9 is a plan view of the power plant installation in the wing of the aircraft. Portions of the power plant and wing are shown in section along the central axis of the power plant. The airfoil lift augmenting contrivance of the power plant is likewise illustrated.

An annular jet blanket is formed about the core 78 by the jets 72 issuing from the core and the blanket sweeps rearward along the surface of the gear housing 51 and over the hubs 30 and 20, as shown in Figure 9. Some gaps 400 are provided between the core 78 and the wing 1 so that the continuity of the blanket will not be disrupted, and only the skin 2 of the wing is brought into contact with the core.

In Figure 9 the power plant derives heat from an "open" combustion chamber 612 of a vapor generator 206. A flame 209 in the chamber 612 propagates a combustion gas flow 207 which traverses a boiler tube 211 of the generator and drives a gas turbine 205. Finally the combustion gases are wasted from a stack 208. The gas turbine drives some vapor generation accessories 204 including a feed liquid pump 213 which extracts feed liquid from the core 78 along a conduit 214. The liquid is driven from the pump 213 along a feed conduit 212 into the boiler tube 211. The working vapor formed in the boiler tube is supplied to the high pressure turbine 56 along a vapor supply conduit 218. The generator 206 and the turbine 205 are cylindrical in shape and are joined end to end along the axis A adjacent to the forward end of the sleeve 90. A shaft 203 for driving an air propeller fan 201 having some blades 202 is extended from the gas turbine along the axis A. A venturi 210 encompasses the fan and is coaxially supported within the sleeve 90. The venturi communicates with the pressure throat 71 of the heat disposal core 78. A shaft 209 forms a drive connection between the high pressure turbine 56 and the fan 201.

Figure 10:
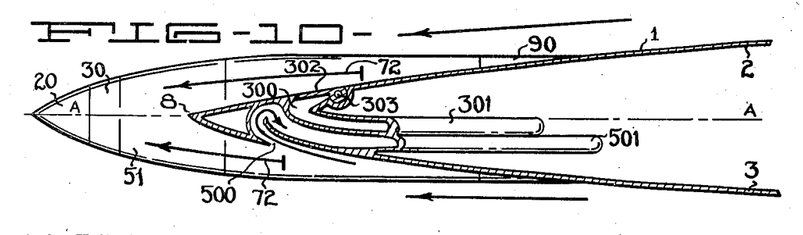
Figure 10 is a view of the wing, in elevation and section, portraying the air flow configuration adjacent to the wing and to the lift augmenting contrivance during relatively high speed flight of the aircraft.

Figure 10 and the part of Figure 9 below the axis A represent the direction of the cooling air flow during normal high speed flight. The air is collected in a relatively long and narrow air scoop 500 extending from the lower skin 3. The scoop 500 is parallel and near to the trailing edge 8. Although there is a slight pressure built up in the scoop due to impact, the scoop does not result in wing-spoiling because the flow above the wing is not reduced. The air is conducted from the scoop along an air duct 501 into the venturi 210 and forced by the fan 201 into the throat 71.

Figure 11:
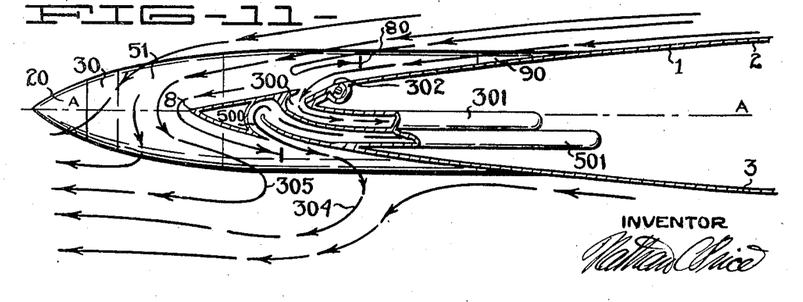
Figure 11 is a view of the wing, in elevation and section, showing the air flow configuration adjacent to the wing and to the lift augmenting contrivance during an approach of the aircraft to land.

Figure 11 and the part of Figure 9 above the axis A illustrates the direction of the cooling air flow during approach of the aircraft to land. In this case pumping direction of the fan 201 is reversed and as a result there exists a negative pressure in the throat 71. Therefore air is sucked radially inward through the gaps 70 of the core 78 to cool the core and is then forced backward along the duct 501 by the fan 201. The heated air is expelled from the scoop 500 in a forward and downward braking jet 304. The reaction upon the wing tends to force it upward and backward. Furthermore the jet 304 acts as a jet pump, which produces a negative pressure at the trailing edge of the wing. Accordingly some air above the wing near the trailing edge 8 is drawn past the trailing edge in a downward current 305. This latter action prevents air from below the wing from eddying upward around the trailing edge 8 to the upper side of the wing, which is the customary cause of wing stalling.

The lift of the wing is further augmented by the addition of heat to the air passing backward along the duct 501. In Figure 9 a bypass conduit 306 diverts some hot working vapor from the vapor supply conduit 218 and brings the vapor into heat exchanging relationship with the air in the duct 501. The cooled vapor is subsequently led into the heat disposal core 78. The addition of heat to the air in the duct 501 increases the effectiveness of the jet 304 which attains a higher velocity due to the greater expansion resulting from the air heating. The amount of heating of the air may be regulated by a throttling valve 307 in the conduit 306.

Another cooperative mechanism for wing lift augmentation is embodied in a relatively long and narrow slot 300 in the upper skin 2 parallel to and forward of the trailing edge 8. The slot 300 has an inward opening flap 302 and is connected to the throat 71 by a duct 301. Therefore when the approach to land is being made, the negative pressure in the throat 71 opens the flap 302 and causes air to be sucked from above the wing into the slot 300. This controls the air boundary layer above the skin 2 preventing air turbulence at the trailing edge from spreading forward and past the slot along the top of the wing, by consumption of the turbulent air. Some air currents 80 feeding cooling air into the core 78 likewise prevent spread of turbulence from the power plant along the upper surface of the wing.

Figure 12:
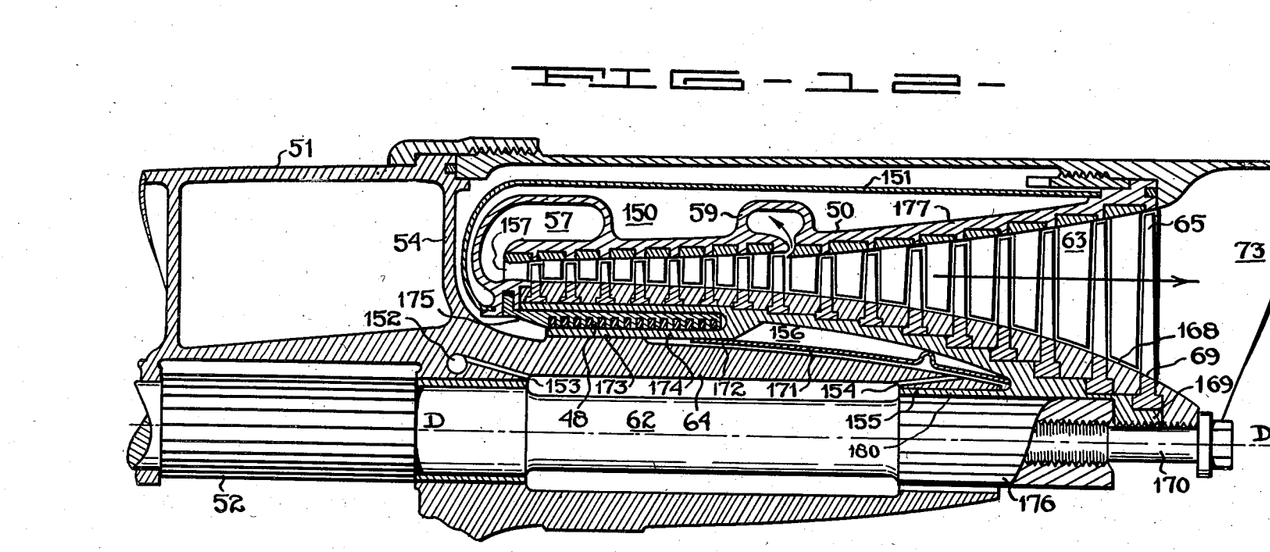
Figure 12 is a view of one of the low pressure turbines of the turbine cluster of the power plant, in half section along the axis of rotation of the turbine wheel.

Figure 12 illustrates the details of construction of the low pressure turbine 50 which is especially adapted to cooperate with the core 78. The wheel 69 has an origin for support adjacent to the vapor inlet end only. In this way the obstruction which an outlet end bearing would offer to the exhaust vapor is obviated. Yet the high rotative speed and the considerable axial length of the wheel predicate adequate bearing supports spaced a substantial distance apart. Accordingly the wheel 69 is made hollow. A basal bearing 173 and an end bearing 155 on the surface of a tubular spindle 64 projecting from the web 54, align the wheel 69 from within.

The bore of the spindle 64 encompasses a drive shaft 62 of the pinion 52. The shaft 62 is joined to the wheel 69 at the exhaust end by a spline 176 for transmitting torque and by a tie-bolt 170 for transmitting thrust. The turbine bearings 155 and 173 do not bear directly upon the inside of the wheel 69, but rather upon the inner surfaces of some sleeves 180 and 174 respectively, which adjacent to the bearings are spaced from the inner surface of the wheel. The sleeves 180 and 174 are attached at one end of each to the wheel 69, but these attachments are at a substantial distance from the bearings. The spaces between the sleeves and the wheel prevent undue heat transmission from the hot wheel to the bearings because the heat must travel a considerable distance along the metal before it can reach bearings.

Oil for lubrication and cooling of the bearings is supplied under pressure at a conduit 152 in the web 54. The oil passes along a conduit 153 into the space between the spindle 64 and the shaft 62 at the end of which it contacts the bearing 155. Some of the oil by-passes the bearing 155 through a conduit 154 in the spindle 64 and subsequently flows back along the outside of the spindle to the bearing 173. Between the sleeves 180 and 174 is an annular vacuum space 156 defined by the inner surface of the wheel 69 and by a sleeve 171 which is spaced from the wheel and bonded to the inner surface of the wheel at the ends of the sleeve 171. Thus the oil flowing about the spindle receives only a limited amount of heat from the wheel 69 due to the comparatively small heat transmission through the vacuum.

The spindle 64 must be relatively thick in order that the wheel 69 and the buckets 65 may be accurately located between an inner casing 177 and some turbine nozzle rings 63 of the turbine. This situation requires that the metal sections in the turbine wheel be thin, so that the spindle can be accommodated within the wheel. Yet the wheel must have great strength in order to guard against bursting at high speed. Accordingly I have found that an altogether new turbine wheel construction is expedient.

Figures 13, 14:
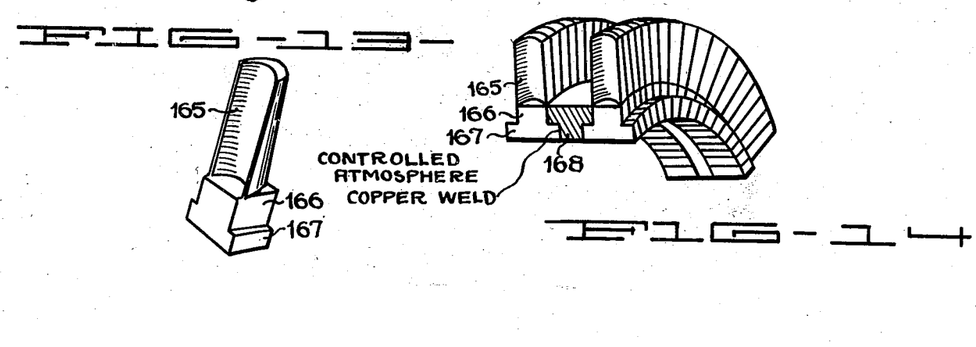
Figure 13 is a perspective view of a bucket of the turbine.
Figure 14 is a perspective view of a fragment of the wheel of the low pressure turbine.
Figure 14:
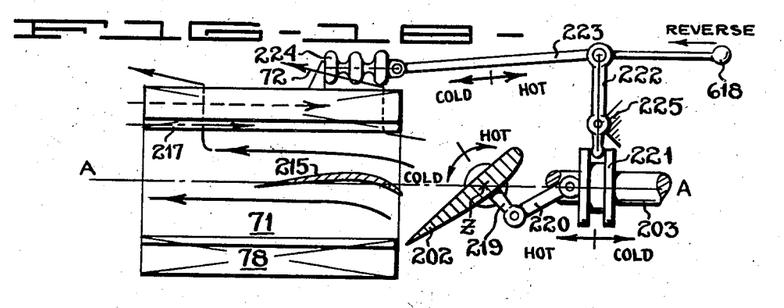

It is customary to wedge or lock turbine buckets mechanically within grooves in the wheel and the presence of the buckets therefore detracts rather than contributes to the bursting strength of the wheel. In the invention each bucket is a forging, as shown in Figure 13, comprising a blade 165, a body 166, and some lateral shoulders 167. During manufacture the buckets are assembled with the shoulders pressed beneath some rings 168, as illustrated in Figure 14. The buckets and the rings are then pressed about a tube 169, as shown in the assembled wheel of Figure 12, and are bonded to the tube 169 by a controlled atmosphere copper weld, so that the separate parts become a single piece of metal, and unlike conventional turbines the bodies 166 and the shoulders 167 of the buckets share the wheel stresses. Therefore the wheel is very strong although thin. Due to the use of over-hung bearings the wheels may be streamlined. Thus the end of each wheel adjacent to the supply chamber 73 is relatively sharp, which permits large flow areas to be provided at the low pressure end. Large vapor expansion is readily accomplished and the exhaust working vapor leaves the last row of buckets smoothly.

Leakage of working vapor from the receiver 57 to the interior of the housing 51 is prevented by a packing sleeve 48 imperforately joined to the inner casing 177 and extending between the outer surface of the sleeve 174 and the inner surface of the tube 169.

In order to reduce heat loss from the turbine casing 177 there is provided a sleeve 151 which surrounds and is spaced from the casing but which is imperforately bonded to the casing at the ends thereof to define an annular vacuum space 150. A working vapor extraction chamber 59 which directs bled-off working vapor to an extraction conduit 68 for regenerative feed liquid heating is located within the space 150. The conduit 68 is shown in Figure 2.

It is also indicated in Figure 2 that the support and construction of a wheel 55 of the high pressure turbine 56 is like that of the wheels of the low pressure turbines. However in the high pressure turbine the lesser diameter of the wheel is adjacent to the high pressure region and the greater diameter is adjacent to the low pressure region. The working vapor is discharged most directly to some inlet nozzle rings 157 of the low pressure turbines with this arrangement. Frequently the bucket heights in turbines tend to be disproportionately small compared with the diameter of the wheel adjacent to the high pressure end. In the invention there is no disproportionality because the high pressure end of the wheel can have a much smaller diameter when no main support bearing is adjacent thereto.

Figure 16:
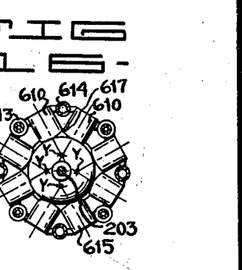
Figure 16 is an end view of the closed combustion chambers of the power plant.

Figure 16 represents an internal combustion engine 615 which has four crank shaft axes Y spaced at ninety degree intervals and parallel to the shaft 203. Each axis Y defines the apex of a V 617 of combustion cylinder banks 610. Each V extends radially outward from the axis A, so that the external shape of the engine tends to approximate a cylinder conforming to the shape of the remainder of the power plant. In the fold of each V 617 is a combustion air induction manifold 614. Between adjacent V's are some waste heat boilers 613. The internal combustion engine may be employed as a working fluid generator to be hereinafter described.

Figure 15:
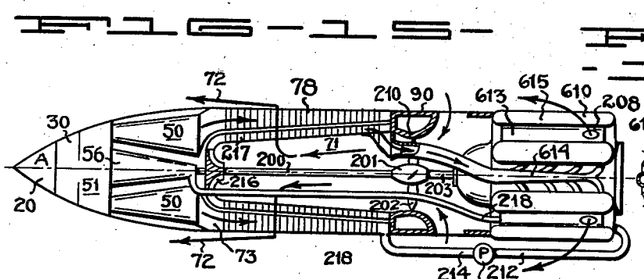
Figure 15 is a side view of a modified form of the power plant employing closed combustion chambers. The heat disposal core and air compressing arrangements are illustrated in section along the central axis of the power plant.

In Figure 15 a centrifugal air blower impeller 216 is fixed on the shaft 200 adjacent to the turbine 56. The impeller 216 draws compressed air from the chamber 71, compresses it further, and forces the air longitudinally through a cylindrical air intercooler core 217 bounding the throat 71. The core 217 resembles the condenser core 78 and is concentric therewith. The core 217 can be part of the condenser core 78.

The cooling air from the pressure throat 71 preferably sweeps the core 217 prior to entering the core 78 because the combustion air should ordinarily be cooled to a lower temperature than that of the condensate of the exhaust working vapor in the core 78. However there can be exceptions to this rule and in such case the intercooler core may surround the condenser core.

The compressed and cooled combustion air issuing from the forward end of the core 217 is led into the manifold 614. It is the function of the core 217 to reduce the work of compression required for supplying the cylinders of the internal combustion engine 615, and to reduce the air temperature in order to suppress combustion chamber detonation.

Figure 17:
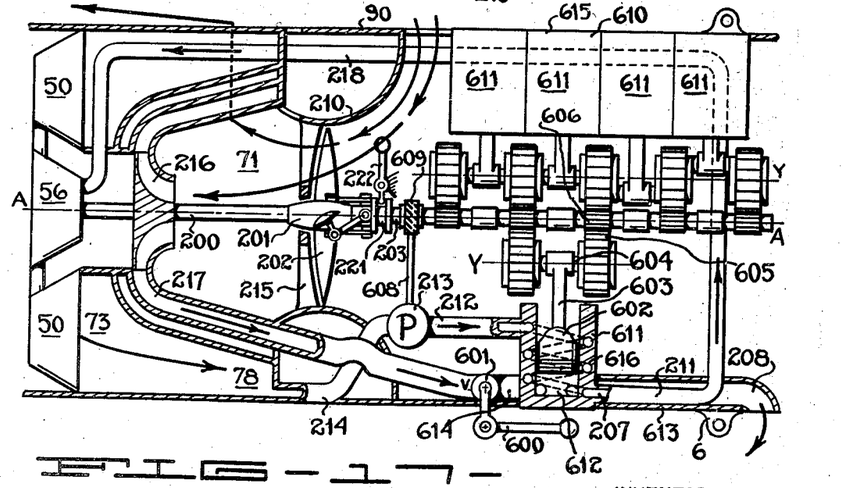
Figure 17 is a section of a modified form of the power plant, along the central axis.

In Figure 17 an air throttle valve 601, which can be actuated by a lever 600, is shown in the manifold 614. Closure of the valve 601 causes the engine to cease running. The graduated control of engine power output is accomplished by a regulation of air pressure in the throat 71 through a structure to be described.

A spiral gear combination 609 on the shaft 203 drives a cross shaft 608 for the feed liquid pump 213. The conduit 212 discharges feed liquid into a helical channel 616 within the walls of a combustion cylinder 611 of the banks 610. The channel 616 cools the cylinder by vaporization of the liquid, thereby forming a working vapor which is subsequently superheated in the boiler tube 211 of the waste heat boiler 613. Within the cylinder 611 is an internal combustion chamber 612 for driving a piston 602. The piston delivers power along a connecting rod 603, a crank shaft 604, a drive gear 605, and a driven pinion 606 to the shaft 203.

In Figure 18 is shown a control for the air propeller fan blade 202. A bellows 224 containing a volatile substance, such as alcohol for example, is located in the cooling air issuing from the heat disposal core. If the bellows becomes heated beyond a predetermined temperature due to insufficiency of the cooling air flow rate compared to the rate of heat input to the heat disposal core, the alcohol vaporizes and causes the bellows to expand abruptly. The expansive effort of the bellows is transmitted along a connecting rod 223 to a rocker arm 222 having a fulcrum 225. The motion of the rocker arm shifts a yoke 221 axially along the shaft 203. The movement of the yoke displaces a connecting rod 220 and a lever arm 219 of the blade 202, so that the blade is rotated about its axis Z into a higher pitch angle, thereby forcing more air into the throat 71 to counteract the insufficiency of cooling air supply.

If on the other hand the temperature of the jet 72 tends to fall below the predetermined temperature, the bellows will contract abruptly due to condensation of the alcohol within. The contraction reverses the described motion of the overall linkage between the bellows and the blade and forces the blade 202 into a lower pitch. Accordingly the pressure in the throat 71 is decreased and the cooling of the cores 217 and 78 is diminished to an optimum value. A diffuser 215 is provided in order to convert the twist of the air leaving the blade 202 into static pressure in the throat 71.

The described control automatically maintains a substantially constant exhaust vapor pressure in the condenser core 78 and substantially constant combustion air temperature in the core 217 although the speed of the aircraft, the density of the atmospheric air, or the attitude of the aircraft may be varying. Accordingly there is conservation of power contributed for cooling.

Of further importance is the placement of the fan 201 at the entrance to the throat 71, which leads to compactness and efficiency of the cooling system. The air flow course resulting from this arrangement is most direct, and the elimination of interconnecting ducts between the fan and the core prevents air pressure loss.

The use of a variable pitch fan blade 202 allows an economical control of air flow to be established due to the elimination of necessity for throttling the air to regulate its flow. The blade 202 is efficient within a wide range of pitch settings and therefore throughout a considerable range of pressure rises or quantity discharges. On the other hand throttling regulation of the air flow or pressure would introduce a relatively great loss of power under many power plant operational conditions.

In order to produce complete reversal of flow of the cooling air during the approach of the aircraft to land when the lift of the wing is to be increased, there is provided a landing control knob 618 in connection with the rocker arm 222 so that the blade 202 may be forced into negative pitch, and this causes a negative pressure to exist in the throat 71 as well as a change of air flow configuration about the wing as previously described.

The pitch of the fan blade 202 may be manually biased within the forward pitch range as well the reverse pitch range to effect a change in power plant output either greater or less than that established by the thermostatic control of the bellows 224, for variations in the pressure in the throat 71 affect the volumetric efficiency of the combustion air impeller 216, and in turn the power produced depends upon the amount of combustion air supplied to the combustion chambers.

I claim:

1. An aircraft power plant comprising a propeller, a heat engine for driving said propeller, a heat disposal core having a first end and a second end opposite to said first end thermally associated with said engine, an attachment for joining said first end to said aircraft, and means for supporting said propeller by said second end.

2. An aircraft power plant as defined in claim 1 and further characterized by said attachment consisting of a first fastening affixed to said aircraft, a second fastening affixed to said first end, and a removable pin for joining said first fastening to said second fastening.

3. An aircraft power plant comprising a propeller, a heat engine for driving said propeller, a heat disposal core thermally associated with said engine, a plurality of interstices in said core, a central recess in said core communicating with said interstices, a compressor for forcing fluid into said recess, and means for supplying relatively cool air to said compressor.

4. An aircraft power plant comprising a propeller, a heat engine for driving said propeller, a heat disposal core thermally associated with said engine, an interstice in said core having an inlet and an outlet, a compressor for forcing fluid into said inlet, means for supplying a fluid to said compressor, and said outlet facing in a direction opposed to the direction of flight of the aircraft.

5. An aircraft power plant as defined in claim 4 and further characterized by a device sensitive to the rate of heat transmission from said core to said fluid, a mechanism for adjusting the rate of discharge of said compressor, and an arrangement for said device to regulate said mechanism.

6. An aircraft power plant as defined in claim 3 and further characterized by an induction system for conducting air for combustion from said recess to said engine.

7. An aircraft power plant as defined in claim 4 and further characterized by a wing of the aircraft, a structural member in said wing, said core being extended from said member in a direction opposed to that of flight of the aircraft, a gap between said wing and the outer surface of said core, and said outlet discharging into said gap.

8. An aircraft power plant as defined in claim 3 and further characterized by said core being composed of a plurality of annular discs, and a plurality of longitudinal tubes spacing said discs apart and in thermal contact with said discs.

9. An aircraft power plant comprising a device for generating a working fluid, an induction system for supplying said device with media for forming said fluid, an expansion chamber for converting heat into propulsive effort for propelling the aircraft, an arrangement for bringing said fluid from said device into said expansion chamber, a heat disposal core for dissipating waste heat of the power plant, an interstice in said core, a compressor, a wing of the aircraft, an expansion nozzle attached to said wing, and means for enabling said compressor to force cooling air through said interstice into said nozzle.

10. An aircraft power plant comprising a device for generating a working fluid, an induction system for supplying said device with media for forming said fluid, an expansion chamber for converting heat into dynamic effort for propelling the aircraft, an arrangement for transferring said fluid from said device into said expansion chamber, a heat exchanger for dissipating heat of the power plant, a compressor, means for enabling said compressor to force cooling air through said exchanger, a wing of the aircraft, a first nozzle attached to said wing and facing in a first direction, a second nozzle attached to said wing and facing in a second direction, flow diverting mechanism for inducing said air to flow from said exchanger selectively into said first or into said second nozzle, and an apparatus for regulating said mechanism.

11. An aircraft power plant as defined in claim 9 and further characterized by a low pressure region adjacent to one side of said wing, a supply inlet for air to be led to said compressor, and said inlet being located adjacent to said region.

12. A power plant as defined in claim 1 and further characterized by said core being tubular in shape, a reduction gear set supported by said second end of said core for driving said propeller, a relatively high speed shaft along the axis of said core for driving said gear set, and said heat engine for driving said shaft.

13. A power plant comprising a propeller shaft, a turbine for driving said shaft, a generating device for supplying said turbine with working vapor, a heat disposal core having a cylindrical form, an axial bore in said core, a relatively cool fluid in said bore, means for conducting exhaust working vapor from said turbine into said core directly, the axis of said core being parallel to the axis of said turbine, a plurality of interstices in said core, said interstices connecting said bore with the outside of said core, a fluid surrounding said bore, and a mechanism for producing a pressure differential between the fluid in said bore and the fluid outside of said core.

14. A power plant as defined in claim 13 and further characterized by a rotating wheel of said turbine, an axial hollow in said wheel, and a stationary spindle projecting into said hollow.

15. A power plant as defined in claim 13 and further characterized by a rotating wheel of said turbine, an axial hollow in said wheel, a stationary spindle projecting into said hollow, a plurality of buckets for said wheel, a sleeve, and said wheel being constructed of said buckets and said sleeve welded together.

16. A power plant as defined in claim 3 and further characterized by a first passage in said core, a mechanism for forcing combustion air through said first passage into said engine, a second passage in said core, means for delivering coolant for use in said engine, and a conduit for transferring said coolant from said engine to said second passage.

17. A power plant as defined in claim 3 and further characterized by an inlet of said recess, an impeller of said compressor, and said impeller being located adjacent to said inlet.

18. A power plant as defined in claim 3 and further characterized by an inlet of said recess, an impeller of said compressor, a blade of said impeller, and a mechanism for adjusting the pitch of said blade.

19. A power plant as defined in claim 3 and further characterized by said core being composed of a plurality of annular discs, a plurality of longitudinal tubes in thermal contact with said discs and spacing said discs, and the outer edges of said discs being curled in a direction opposed to the direction of flight of the aircraft.

20. A power plant as defined in claim 1 and further characterized by said core being tubular in shape, a reduction gear set supported by said second end of said core for driving said propeller, a relatively high speed shaft along the axis of said core, an air blower impeller mounted on said shaft, an arrangement for supplying air to said impeller, and said heat engine for driving said shaft.

NATHAN C. PRICE.